Oct. 2, 1928.  1,685,794
T. C. WHITEHEAD
BRINE TANK
Filed Jan. 12, 1925  3 Sheets-Sheet 1
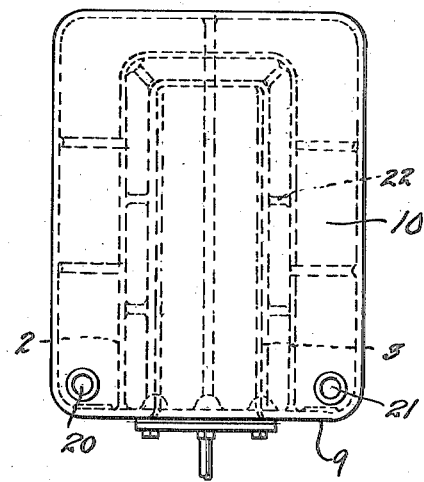
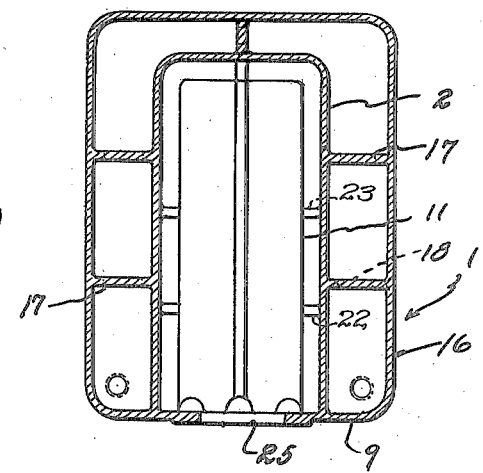
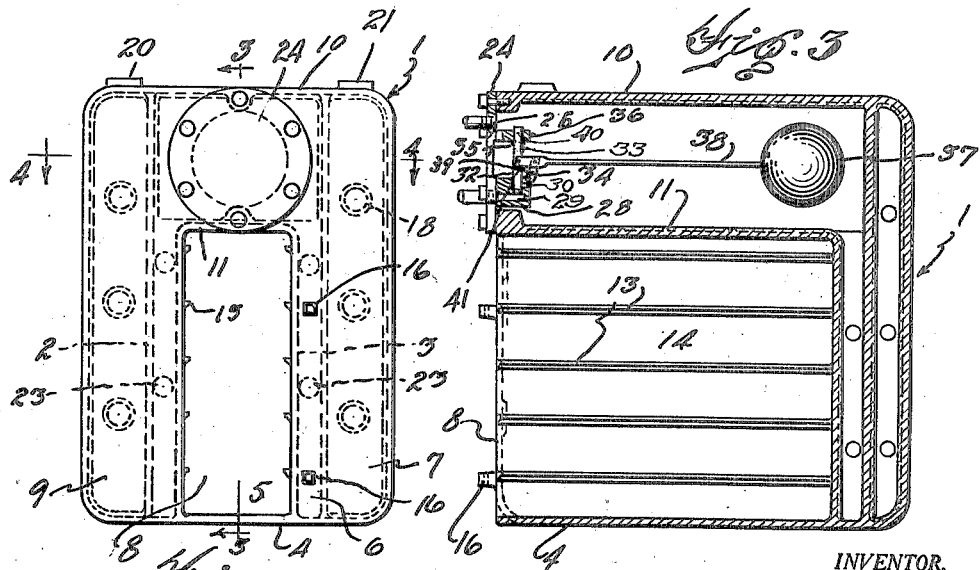
INVENTOR.
THOMAS C. WHITEHEAD
BY
Whittemore Hulbert Whittemore
Belknap  ATTORNEYS

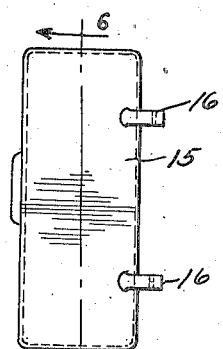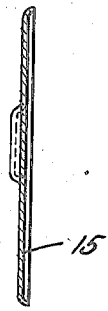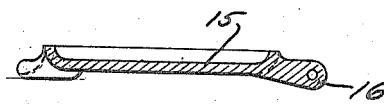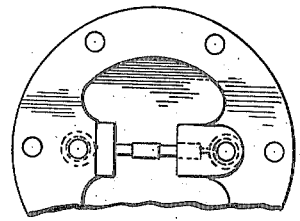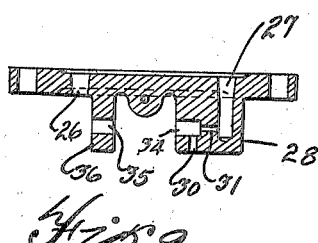

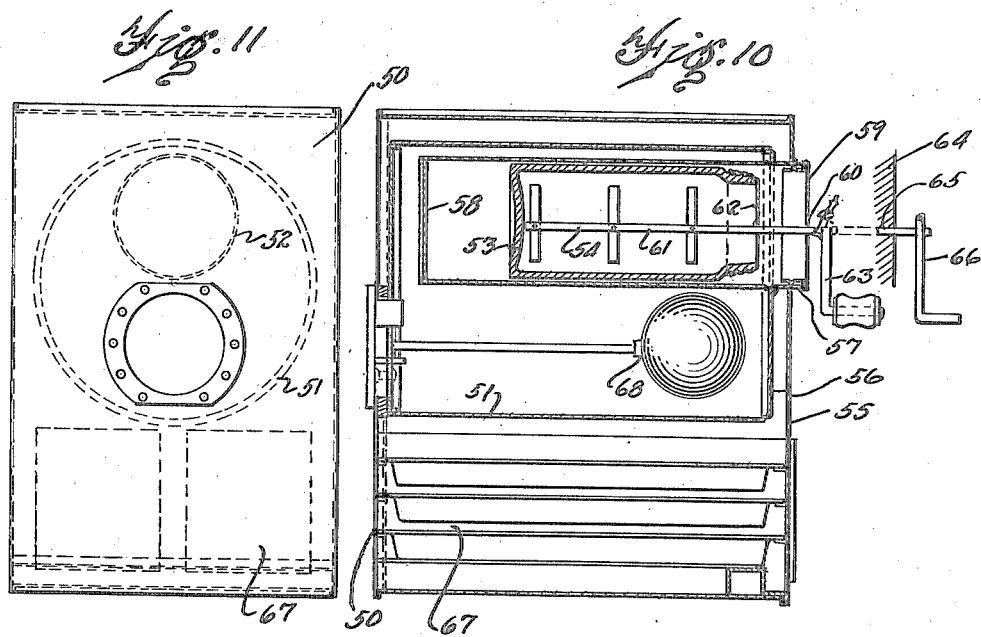
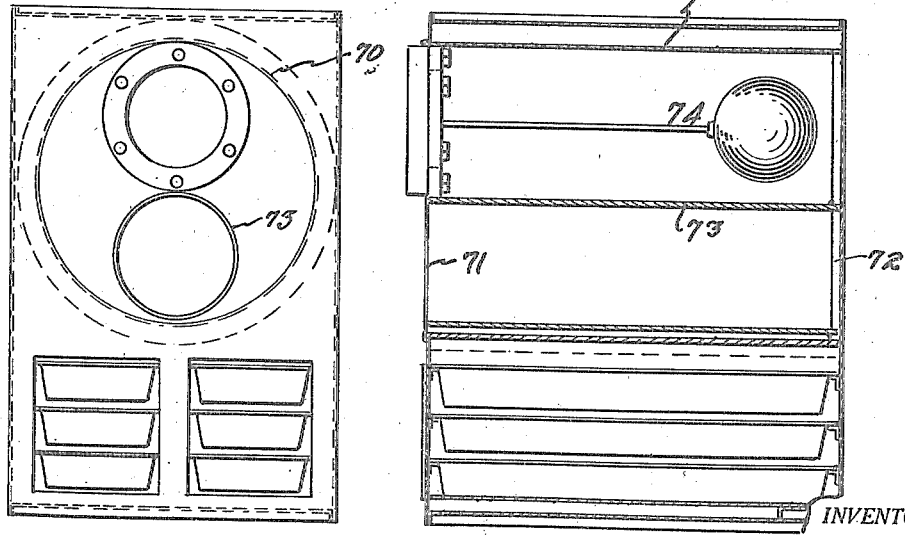

Patented Oct. 2, 1928.

1,685,794

UNITED STATES PATENT OFFICE.

THOMAS C. WHITEHEAD, OF DETROIT, MICHIGAN.

BRINE TANK.

Application filed January 12, 1925. Serial No. 2,049.

This invention relates to refrigerating apparatus and refers more particularly to the brine tanks thereof.

One of the essential objects of the invention is to provide a tank of this type in which the refrigerating medium is adapted to circulate freely in an intermediate chamber that is preferably disposed between an outer chamber containing the brine or other liquid having a low freezing point, and an inner chamber containing the molds or trays in which ice may be formed for table or other use.

Another object is to provide simple and effective float operated means at the top of the tank for automatically maintaining the refrigerating medium at a relatively high level in the entire chamber.

A further object is to provide a brine tank in which the chamber containing the fluid having a low freezing point is adapted to receive a container for ice cream ingredients.

Still another object is to provide simple and effective means for agitating the ice cream ingredients while the container therefor is within the brine tank chamber containing the fluid having a low freezing point.

A further object is to provide a strong and durable tank that is simple and compact in construction and may be manufactured at a comparatively low cost.

With the above and other objects in view the invention consists in certain novel features of construction, combinations and arrangements of parts as will be more fully described and particularly pointed out in the appended claims.

In the accompanying drawings;

Figure 1 is a front elevation of a brine tank embodying my invention with the door removed.

Figure 2 is a top plan view thereof.

Figure 3 is a vertical sectional view taken on the line 3—3 of Figure 1.

Figure 4 is a horizontal sectional view taken on the line 4—4 of Figure 1.

Figure 5 is a detail elevation of the door.

Figure 6 is a sectional view taken on the line 6—6 of Figure 5.

Figure 7 is a cross sectional view through the door.

Figure 8 is a fragmentary front elevation of the cap or closure for the float chamber.

Figure 9 is a sectional view through the cap shown in Figure 8.

Figure 10 is a vertical longitudinal sectional view through a slightly modified form of brine tank.

Figure 11 is a front elevation of the brine tank shown in Figure 10.

Figure 12 is a vertical longitudinal sectional view through another modified form of brine tank.

Figure 13 is a front elevation of the brine tank shown in Figure 12.

Referring now to the drawings in which like characters of reference designate corresponding parts throughout the several views, the numeral 1 designates a brine tank that is preferably cast iron and is provided with the spaced partitions 2 and 3 respectively that extend upwardly from the bottom 4 of the tank and divide the latter into a central chamber 5, an intermediate chamber 6, and an outer chamber 7 respectively. As shown in Figure 2, the partition 3 is preferably U-shape in cross section and preferably extends rearwardly from the opposite side edges of the vertical opening 8 in the front wall 9 of the tank. As shown in Figure 3, the partition 3 terminates short of the top wall 10 of the tank and connects into a horizontal partition 11 which connects into the front wall 9 of the tank. Located in the chamber 5 are spaced horizontal ribs or shelves 13 which preferably extend longitudinally of the parallel portions 14 of the partition 3 and are adapted to support suitable molds or trays (not shown) in which ice may be formed for table or other use. In order that this chamber 5 may be normally closed, I preferably provide a suitable door 15 that is hinged upon suitable lugs 16 projecting outwardly from the front wall 9 of the tank at one edge of the opening 8. Any suitable means (not shown) may be used to hold the door in closed position.

As shown in Figures 2 and 3, the partition 2 is also preferably U-shape in cross section and projects rearwardly from the front wall 9 of the tank. This partition 2 preferably extends to the top wall 10 of the tank and is connected to the side walls 16' by means of spaced vertical transversely extending webs or partitions 17 which have suitable openings 18 therein through which the brine or other liquid having a relatively low freezing point may flow freely. The brine may be supplied to and discharged from the chamber 7 as desired through suitable conduits (not shown) which are preferably connected to suitable inlet and outlet openings 20 and 21 respectively in the top wall 10 of the tank. As shown in Figures 1 and 2 the partition 2 is also connected to the inner partition 3 at spaced points therein by means of the vertical transversely extending webs or partitions 22 which have suitable openings 23 therein through which the refrigerating medium may flow freely.

In order that the level of the refrigerating medium used to cool the brine may be maintained at a relatively high level in the chamber 6, I preferably provide suitable float operated mechanism which is preferably located between the horizontal partition 11 of the tank and is mounted on a cap 24 which closes a circular opening 25 in the front wall 9 of the tank. This cap is also preferably a casting and has outlet and inlet passages 26 and 27 respectively through which the refrigerating medium may be supplied to and removed from the chamber when the cap is attached thereto. The inlet passage 27 is preferably formed in an inwardly projecting enlargement 28 of the cap and is provided with the spaced longitudinally extending passages 29 and 30 respectively and a vertical passage 31 connecting the adjacent ends of the passages 29 and 30. The passage 29 is preferably larger in diameter than the portion 30 and is adapted to be connected to a suitable discharge conduit (not shown) while the portion 31 is relatively small in diameter and is adapted to receive the lower end of a suitable valve 32. This valve has an enlarged stem portion 33 that is slidably mounted in aligned vertical openings 34 and 35 respectively formed in the enlargement 28 and in a horizontal projection 36 extending inwardly from the cap 24 immediately below the outlet opening 26. For operating the valve 32, I preferably provide a float 37 having a relatively long arm 38 that is preferably pivoted on a lug 39 projecting inwardly from the cap 24 intermediate the projection 36 and the enlargement 28 and that is connected to the stem 33 of the valve by a pin 40. This pin preferably extends through the stem and loosely engages aligned elongated openings 41 in a bifurcated end portion of the arm 38. Thus the valve 32 will be operated by the arm 38 of the float and the movement of the latter will be controlled by the level of the refrigerating medium in the chamber 6.

From the foregoing description it will be readily apparent that the entire chamber 6 is capable of holding a large volume of liquid and its location between the outer chamber 7 containing the brine and the inner chamber 5 containing the molds is a decided advantage over constructions now in use, for the reason that the refrigerating medium is next to and surrounds the chamber containing the ice molds so that the cubes in the molds will be frozen quicker and a more uniformly low temperature may be maintained in the entire body of brine than is otherwise obtainable. Moreover the float operated mechanism located at the top of the tank serves to maintain the refrigerating medium at a relatively high level and thus provides a relatively deep cooling surface for the brine and assists materially in maintaining the low temperature desired. Furthermore, it is apparent that the copper coils commonly used for conveying the refrigerating medium through brine tanks of refrigerating apparatus have been eliminated entirely in my apparatus. It will be further apparent that all the desired results are obtained by the use of relatively few parts and that in view of this simplicity of construction, the cost of manufacturing such tanks has been reduced to a minimum.

In Figures 10 and 11 respectively I have shown a slight modification in which the brine tank 50 is preferably formed of sheet metal and is provided at the top thereof with a tubular float chamber 51 containing the fluid having a low freezing point. In order that the ice cream ingredients may be frozen within this chamber I preferably provide a tubular casing 52 for receiving a suitable jar or cylinder 53 in which the proper ingredients for ice cream may be agitated by a suitable dasher 54. As shown, the tubular casing 52 preferably projects through the closed front end of the chamber 56 and the front wall 55 of the brine tank. To provide a strong and durable construction, the casing 52 is preferably welded to the closed end 56 of the chamber 51 and is secured to an annular flange 57 projecting outwardly from the front wall 55 of the brine tank. The inner end of the casing 52 is permanently closed by a cup-shaped cap 58 while the outer end thereof is preferably open to permit the jar or cylinder 53 to be readily inserted or removed. A removable flanged cup-shaped cap 59 is preferably provided for the open end of the casing 52 and is preferably provided at the centre thereof with a suitable bearing opening 60 for the shaft 61 of the dasher 54. This shaft 61 also extends through a suitable cup-shaped cap 62 that threadedly engages the outer open end of the jar or cylinder 53. This shaft is adapted to be rotated by a suitable crank 63. When this crank 63 is used, the usual door 64 of the refrigerator is open. However, when it is desired to rotate the dasher 54 when the refrigerator door is closed, the crank 63 is removed from the shaft 61 and I preferably use an extension 65 that is applied to the free end of the shaft 61 and extends through the door 64. Any suitable means such as the crank 66 may then be applied to the extension 65 to rotate the dasher. With this construction, two chambers 67 for ice trays or molds are preferably located at the bottom of the brine tank while a suitable float 68 is preferably located at the bottom of the chamber 51.

In Figures 12 and 13 I have shown another modification wherein the float chamber 70 is located at the top of the brine tank similar to the chamber 51 but is preferably welded to the front and rear walls 71 and 72 respectively of the brine tank. With this construction, the float chamber 73 is preferably located within the chamber 70 but is positioned above the tubular ice cream casing (not shown).

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim as my invention is:

1. A brine tank having a chamber for ice molds, a chamber containing a liquid having a low freezing point, and a chamber adapted to contain a refrigerating medium, the last mentioned chamber being disposed between the chambers aforesaid and connected thereto.

2. A brine tank having a chamber for ice molds, a chamber containing a refrigerating medium extending around and over the first chamber, and a chamber adapted to contain brine extending around the second chamber and embracing the same.

3. A brine tank having a central chamber for ice molds, an outer chamber for a liquid having a low freezing point, and an intermediate chamber for a refrigerating medium connected to said last mentioned chamber.

4. A brine tank having a chamber for ice molds, a substantially U-shaped chamber embracing the first chamber and adapted to contain a refrigerating medium, and a substantially U-shaped chamber embracing the second chamber adapted to contain a liquid having a relatively low freezing point.

5. A brine tank having a chamber for ice molds, a chamber for brine, and a chamber for a refrigerating medium intermediate the chambers aforesaid, and means in the last mentioned chamber for maintaining the refrigerating medium at a relatively high level.

6. A brine tank having spaced partitions extending upwardly from the bottom thereof, one partition connecting into the top of the tank and cooperating with certain walls of the tank to form a chamber for brine, the other partition terminating short of the top of said tank, a partition projecting inwardly from one wall of the tank and cooperating with the last mentioned partition to form a chamber for ice molds, and means for supplying a refrigerating medium between the spaced partitions.

7. A brine tank having a chamber for ice molds, a chamber for a refrigerating medium extending around and over the first chamber, a chamber for brine extending around the second chamber, and float operated means in the second chamber for maintaining the refrigerating medium at a relatively high level.

8. A brine tank having spaced partitions extending upwardly from the bottom thereof, one of said partitions connecting into the top wall of the tank, spaced vertical transversely extending webs adapted to connect said partition to the side walls of the tank forming a chamber for the brine, openings in said webs through which the brine is adapted to flow freely, a second partition terminating short of the top wall of the tank and connected to the first mentioned partition at spaced points by means of vertical transversely extending webs forming a chamber for the refrigerant, said last mentioned webs provided with openings through which the refrigerant medium may flow freely, and a third partition projecting inwardly from the front wall of the tank and cooperating with the last mentioned partition to form a chamber for ice molds.

9. A brine tank having an opening in the front wall thereof, spaced U-shaped partitions extending upwardly from the bottom of said tank, one partition connecting into the top of the tank and cooperating with certain walls of the tank to form a chamber for brine, the other partition terminating short of the top wall of the tank and extending rearwardly from the side edges of the opening to form a chamber for ice molds, and means disposed between the top wall of the tank and the second mentioned partition for supplying a refrigerating medium between the spaced partitions.

10. A brine tank having a vertical opening in the front wall thereof, a substantially U-shaped partition extending upwardly from the bottom of said tank and extending rearwardly from the side edges of the opening to form a chamber for ice molds, a chamber for a refrigerating medium extending around and over the chamber aforesaid, and a chamber for brine extending around the last mentioned chamber.

In testimony whereof I affix my signature.

THOMAS C. WHITEHEAD.